United States Patent [19]

Karlsson

[11] Patent Number: 4,493,863

[45] Date of Patent: Jan. 15, 1985

[54] CAMOUFLAGE MATERIAL WITH PARTIAL APERTURES FORMING CURLED TONGUES AND METHOD OF MAKING THE SAME

[75] Inventor: Lars G. Karlsson, Gamleby, Sweden

[73] Assignee: Diab Barracuda AB, Laholm, Sweden

[21] Appl. No.: 568,733

[22] Filed: Jan. 6, 1984

[30] Foreign Application Priority Data

Jan. 14, 1983 [SE] Sweden ................... 8300175

[51] Int. Cl.³ .............................................. F41H 3/00
[52] U.S. Cl. ................................... 428/17; 156/61; 156/268; 428/132; 428/919
[58] Field of Search ............... 428/919, 17, 132; 156/61, 253, 257, 268

[56] References Cited

U.S. PATENT DOCUMENTS

| 2,370,734 | 3/1945 | Jost | 428/132 |
| 3,069,796 | 12/1962 | Ruter | 428/919 X |
| 3,119,729 | 1/1964 | Ljungbo | 428/919 X |
| 3,505,083 | 4/1970 | Schelhorn | 428/198 X |
| 3,733,606 | 5/1973 | Johansson | 428/919 X |
| 4,095,940 | 6/1978 | Weingarten | 428/919 X |
| 4,323,605 | 4/1982 | Rush | 428/919 X |
| 4,375,488 | 3/1983 | Hogan | 428/919 X |

FOREIGN PATENT DOCUMENTS

| 1059316 | 7/1979 | Canada | 428/919 |
| 7505180 | 5/1979 | Sweden | |
| 1535260 | 12/1978 | United Kingdom | 428/919 |
| 1605131 | 12/1981 | United Kingdom | |
| 1605187 | 3/1983 | United Kingdom | |

*Primary Examiner*—Henry F. Epstein
*Attorney, Agent, or Firm*—Howard H. Darbo

[57] ABSTRACT

The invention relates to an apertured camouflage material where the apertures are made as arcuate slits so that tongues are formed (FIGS. 4A, 4B). The material is a laminate of a supporting layer to which is applied a plastics layer which is initially under internal tensional stress, the tongues curling outwards when the internal stresses are activated by the slitting and heat (see FIG. 4B) thus forming a three-dimensional camouflage sheet. The pre-stressed material is blown low density polyethylene film.

13 Claims, 9 Drawing Figures

CAMOUFLAGE MATERIAL WITH PARTIAL APERTURES FORMING CURLED TONGUES AND METHOD OF MAKING THE SAME

The invention relates to laminated camouflage material in the form of an apertured camouflage-coloured sheet having curled tongues of the material extending above the surface of the exposed layer of the camouflage material.

By the term "sheet" is herein intended a tarpaulin-like article intended as camouflage for covering military material and the like for the purpose of hiding or masking it. The supporting layer of the article may comprise a woven textile fabric but it may also be a layer of non-woven type or plastics webs of other kinds.

In the prior art there is already camouflage material with a masking effect obtained by a pattern of holes where the holes appear as black grid points, whereby different half-tone patterns and shadow effects are obtained which give good optical camouflaging effect. Such materials are described, for example, in Swedish Pat. No. 7505180-5.

When it is a question of providing a camouflage intended to mask or hide warm objects against infrared reconnaissance, camouflage patterned perforation of this type cannot be used. A hot engine or the like, covered by such perforated material will emit heat radiation, partly through the holes. Coverage will be insufficient to avoid detection.

Infrared reconnaissance is performed with the aid of apparatus (detector matrices, scanning detectors and the like) having good sensitivity within the wavelength bands 3-5 $\mu$m and 8-14 $\mu$m. In such reconnaissance, hot and cold parts are detected and a heat pattern image is obtained. Nature environments, themselves, give patterns of warm and colder surfaces, and a thermal camouflage material should therefore have warm and cold surfaces and emit energy in patterns emulating that of nature.

One object of the invention is to achieve a varied temperature image with a camouflage-colored sheet masking an object which is warm in relation to the surrounding average temperature. Another object is to achieve visibility through such a sheet, so that a person inside the masking area can see the surroundings without being seen.

These and other objects are achieved by the invention in that there is included in the sheet a supporting layer on which is applied a layer of a plastics material with internal tensional stresses, said holes or apertures comprising curved unconnected slits in the sheet, the slits forming tongues of the laminated sheet which are curved outwards from the plane of the sheet towards the side remote from the supporting layer to which said plastics material is applied, the curvature being caused by the action of the internal tensional stresses in said plastics material.

A suitable internally stressed plastics material is low density polyethylene film (LDPE) which film is manufactured by blowing the raw plastic material to thin tubes. This film material is pre-stressed in that internal tension stresses exist, a condition frequently undesirable but made use of in the present invention. During lamination under heat with a supporting layer, e.g. a woven textile web, in forming the camouflage sheet material, the inner stresses will tend to shrink the material, but cannot. When the unconnected slits are cut to form incomplete apertures, the shrinkage stresses in the tongues thus formed are activated and the tongues curl outwardly, and this can go so far that a part of the underside becomes visible in the forward direction of the sheet, which can give small patches of deviating colour.

It is desirable to locate such apertures in zones, so that zones with holes and without holes are alternatingly obtained. A warm object to the interior of such a sheet camouflage material tends to warm the sheet and natural ventilation and, should there be any wind, the draught through the apertures will cause cooling of the sheet material at the apertured zones, while the temperature equilibrium in other zones is more determined by the radiation conditions of the surroundings.

It is desirable to provide the plastics layer with a thin layer of metal on the side facing inwardly, which results in a certain amount of thermal energy reflection. It is also desirable to give a matte surface to the plastics layer so that reflection from this exposed surface is disperse, not the specular reflection that would give an effect noticably distinguishing from the surrounding nature.

The tarpaulin-link sheet obtained can be used as covering and masking sheet per se, and can be provided with different kinds of visible colour patterns, which however, are no part of the present invention.

A material with a high proportionate coverage is obtained with the aid of the invention, and it is desirable that the apertured zones have a coverage degree of about 90%. The size of the apertures in normal camouflage material should not be more than about 15 mm since the tongues obtained will otherwise be too sloppy and the inventive effect lost.

A practical advantage of the invention is the efficient use of material. In normal hole stamping there are obtained waste disks of no value which are difficult to get rid of. In accordance with the invention the holes are only incompletely punched out to form the tongues so that the whole of the manufactured material is used for the intended purpose.

The invention will now be described in detail with the aid of an exemplary embodiment, which is not to be regarded as limiting.

FIG. 1 schematically illustrates the cross section of camouflage sheet suitable for the application of the invention.

FIG. 2 illustrates an example of a zone with apertures cut in the material.

FIG. 3A schematically illustrates equipment for punching the sheet material.

Figure 5:
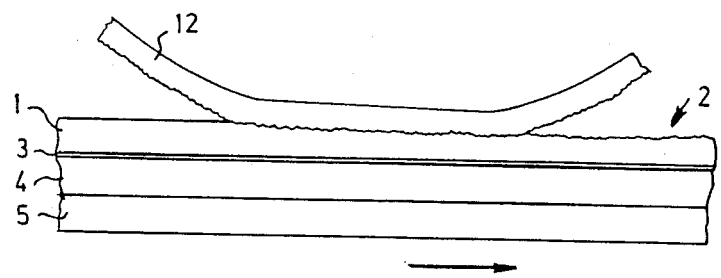

FIG. 5 schematically illustrates a lamination and surface-matting process.

Figure 6:
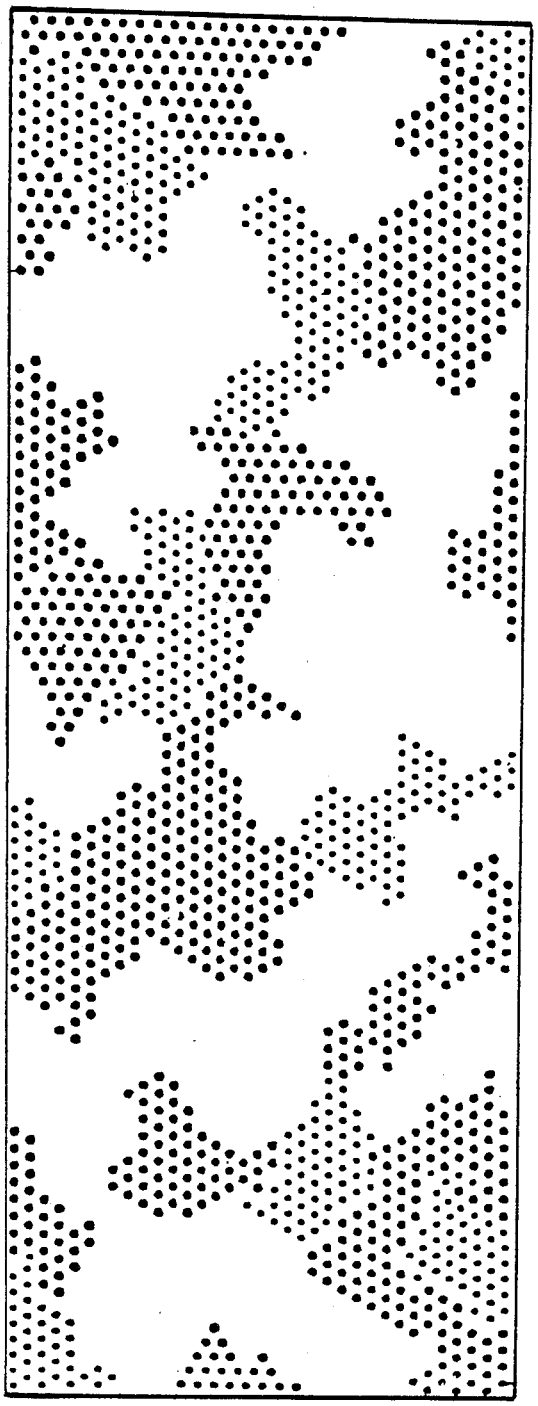

FIG. 6 illustrates an example of an apertured zone pattern.

Figure 1:
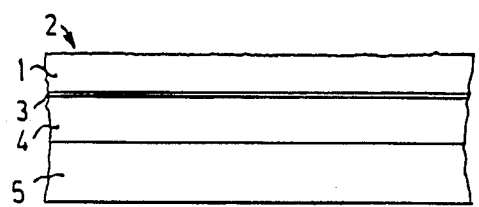

A camouflage sheet of the kind suitable for applying the invention is illustrated in FIG. 1. A layer 1 of blown LDPE containing green camouflage pigment is matted on one side 2 and on the other, opposite side is provided with a vaporized metal deposit 3. The plastics layer is 4 $\mu$m thick (for reasons for clarity the figures are drawn in greatly enlarged scale). This plastics layer is heat laminated with the aid of a fusable adhesion film 4 with a weight of 30 g/m² (IRO, type 240) against a woven cloth 5 of solid drawn multi-filament polyamid 5 (16/16 threads per cm, with a weave of 235 dtex).

Figure 2:
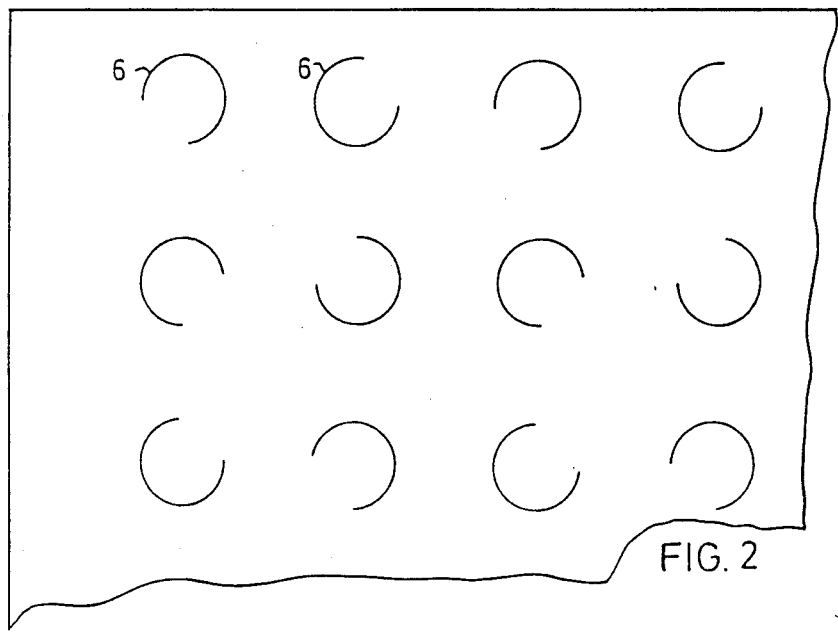

The disposition of the perforating slits 6 is illustrated in FIG. 2, these slits consisting of incomplete circles, and it will be seen that the gaps in (missing portion of) the circles point in different directions, and the tongues thus formed will therefore face in different directions as well.

Figure 3A:
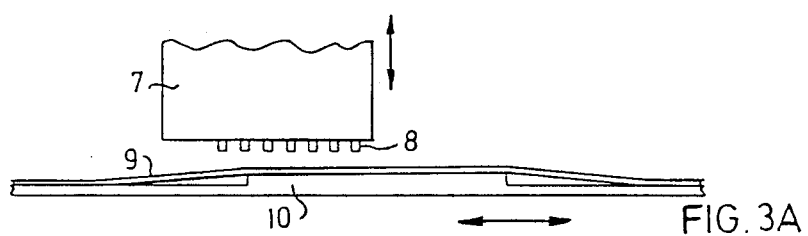
FIGS. 3B and 3C illustrate a suitable hollow punch for cutting the incomplete holes.
Figure 3B:
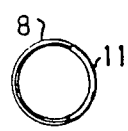
Figure 3C:
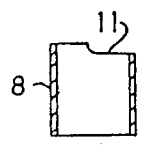

FIG. 3A illustrates a stamping apparatus 7 with a set of hollow punches 8. The stamping apparatus can be given reciprocating motion towards a table or die 10. The die is made such that it has depressed portions, the punches meeting depressed portions not operating against and therefore not cutting the web 9 laid over the die, said web being such as the sheet illustrated in FIG. 1. The punches 8, shown in more detail in FIGS. 3B and 3C in cross section and from the cutting end, have ground-off edge portions 11 to provide uncut gaps in each tongue formation.

Figure 4A:
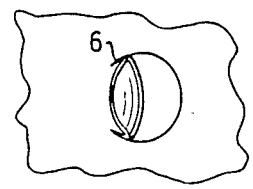
FIG. 4A illustrates a hole and tongue seen from above.
Figure 4B:
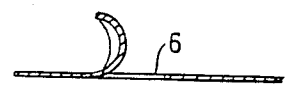
FIG. 4B illustrates the same hole and tongue in cross section.

Due to the stresses in the plastics layer, the incomplete circular portions of the laminate sheet curve upwards like tongues, as illustrated in FIGS. 4A and 4B.

FIG. 5 schematically illustrates a suitable manufacturing procedure for the sheet camouflage illustrated in FIG. 1. The film 1 with its metallized layer 3, the adhesive layer 4 and the woven textile layer 5 are pulled from their respective storage rollers (not illustrated). The film 1 initially has a smooth surface. In one or more heated roll nips a structural pattern transfer sheet 12 is rolled under pressure and heat against the collected layer. The pattern sheet can be a woven viscose material which has been coated with an enamel containing matting agent so that it has a matte surface which will be embossed as a surface structure of the web during the lamination operation.

Since the polyethylene layer has been manufactured while being stretched (the normal known manufacturing process is by blowing to a thin tube which is slit up) there is latent strain in the material and when activated at the heating process during lamination this gives a shrinkage tendency.

A condition for the invention functioning is that the material which is cut with "incomplete holes" includes a first layer, e.g. of woven fabric, and a second layer in which a stress is built in, so that this layer tends to shrink but cannot before the sheet is cut to form the apertures. Although it is preferred to provide this by the described heat lamination of a material with latent stresses, it will be appreciated that a material in stretched condition can be applied, to achieve the thus pretensioned material.

An example of an apertured zone is illustrated in FIG. 6. For the sake of clarity the apertures and tongues have been shown as black patches, although in reality they will be like the shape illustrated in FIG. 4A. What is illustrated in FIG. 6 is repeat length for a web having a width of 1.5 meter. The repeat length is 4.5 m. It should be observed that in this case the apertures have been made in different zones and that outside of these zones the sheet is free from holes. It will also be seen that apertures, and therefore tongues, in two different sizes are present in the pattern, the richness of variation, advantageous in camouflaging, thus being improved. In actual fact, the holes are substantially smaller and more densely disposed. Their diameters is preferably about 15 mm. Also, the openings need not be exactly circular but may be, for example, oblong; indeed, the tongues may have shapes other than circular, e.g. pointed or rectilinear.

With the aid of the multiplicity of small apertures and upwardly curled tongues, good coverage is obtained against observation in spite of the holes, the latter providing some visibility through the sheet and giving a good ventilation effect in an oblique direction.

What is claimed is:

1. Camouflage material in the form of a three-dimensional camouflage-coloured apertured sheet, characterized in that there is included in the sheet a supporting layer on which there is laminated a layer of a plastics material initially having internal tensional stresses, said sheet having variously oriented, unconnected, curved slits going through the sheet, the slits forming apertures in said sheet and forming tongues which, due to the action of the internal tensional stresses in said plastics material that are activated when said sheet is slitted, are curled outwards from the general plane of the sheet away from the supporting layer to which said plastics material is secured.

2. Camouflage material as claimed in claim 1, characterized in that the supporting layer is a woven material.

3. Camouflage material as claimed in claim 1 characterized in that said layer of plastics material is a prestressed polyethylene film.

4. Camouflage material as claimed in claim 1, characterized in that the slits are circular arcs with an angle exceeding 180° and falling below 270°.

5. Camouflage material as claimed in claim 1 wherein said tongues are curled to the extent that the undersides of the free ends of said tongues face outwardly.

6. Camouflage material as claimed in claim 1, characterized in that the apertures and tongues are made in zones of said sheet, the areas outside the zones being free from apertures.

7. Camouflage material as claimed in claim 6, characterized in that apertures of different sizes are made in different zones.

8. The method of making a three-dimensional camouflage sheet which comprises the steps of providing blown low density polyethylene film having latent internal tensional stresses therein, laminating said film to a supporting textile web, cutting the laminate in spaced apart incomplete generally circular slits to form spaced apart tongues of the sheet material and to activate the latent tensional stresses to cause said tongues to curl upwardly.

9. The method of claim 8 wherein the incomplete generally circular slits extend to circular arcs of between 180° and 270°.

10. The method of claim 8 wherein the incomplete generally circular slits are cut with differing mutual orientation.

11. The method of claim 8 wherein the incomplete generally circular slits are cut with diameters not more than about 15 mm.

12. The method of claim 8 wherein the generally circular slits are cut in zones only of the sheet, the remaining areas of the sheet being uncut.

13. The method of claim 8 wherein the tongues are curled to the extent that the undersides of the free ends of said tongues face outwardly.

* * * * *